(12) United States Patent
Bray

(10) Patent No.: US 6,755,427 B1
(45) Date of Patent: Jun. 29, 2004

(54) SYSTEM FOR TRANSPORTING A CONTAINER CONTAINING VISCOUS LIQUIDS TO AN APPROPRIATE DISPENSING APPARATUS

(75) Inventor: Jim Bray, Georgetown (CA)

(73) Assignee: Automotive Line Technology Efficiency Related Equipment Inc., Georgetown (CA)

(*) Notice: Subject to any disclaimer, the term of this patent is extended or adjusted under 35 U.S.C. 154(b) by 0 days.

(21) Appl. No.: 09/689,874

(22) Filed: Oct. 13, 2000

Related U.S. Application Data

(60) Provisional application No. 60/159,556, filed on Oct. 15, 1999.

(51) Int. Cl.$^7$ .................................................. B62B 1/00
(52) U.S. Cl. ........................... 280/47.26; 280/47.34; 280/79.11; 222/405
(58) Field of Search ........................... 280/79.5, 79.11, 280/43.14, 43.24, 776, 47.34, 79.4, 79.6, 79.7, 47.24, 47.26; 14/69.5; 222/146.5, 146.2, 184, 405, 386, 389, 608

(56) References Cited

U.S. PATENT DOCUMENTS

| | | | |
|---|---|---|---|
| 260,833 A | 7/1882 | Bristol | |
| 274,258 A | 3/1883 | Bedell | |
| 422,729 A | 3/1890 | Clark | |
| 471,010 A | 3/1892 | Marshall | |
| 653,129 A | 7/1900 | Arnold | |
| 1,139,240 A | * 5/1915 | Viche | 14/69.5 |
| 1,374,406 A | 4/1921 | Steinke | |
| 2,077,349 A | 4/1937 | Hobbis | |
| 2,461,678 A | * 2/1949 | Christensen | 14/69.5 |
| 2,666,936 A | * 1/1954 | Palmer | 14/69.5 |
| 2,759,207 A | * 8/1956 | Pennington | 14/69.5 |
| 3,480,980 A | * 12/1969 | Yoon et al. | 14/69.5 |
| 3,637,111 A | * 1/1972 | McCreary | 222/146.2 |
| 3,758,003 A | * 9/1973 | Kautz et al. | 222/146.2 |
| 3,766,585 A | * 10/1973 | Yoon | 14/69.5 |
| 3,781,934 A | * 1/1974 | Pink | 14/69.5 |
| 4,209,869 A | * 7/1980 | Trine et al. | 14/69.5 |
| 4,213,624 A | * 7/1980 | Sanders | 280/43.17 |
| 4,630,760 A | 12/1986 | Wold | |
| 4,632,277 A | * 12/1986 | Pallante | 222/146.2 |
| 4,632,281 A | 12/1986 | Wold | |
| 4,635,951 A | 1/1987 | Berfield et al. | |
| 4,650,200 A | 3/1987 | Berfield et al. | |
| 5,361,940 A | 11/1994 | Miller et al. | |
| 5,632,497 A | 5/1997 | Murray | |
| 6,386,560 B2 | * 5/2002 | Calender | 280/47.34 |

\* cited by examiner

Primary Examiner—Brian L. Johnson
Assistant Examiner—Hau Phan
(74) Attorney, Agent, or Firm—Bereskin & Parr

(57) ABSTRACT

An apparatus and system for transporting a container containing viscous liquids to an appropriate dispensing apparatus. The invention comprises a transition plate that fits over a floor plate of a pump elevator, and particularly over an air tube that joins adjacent vertical air cylinders of the pump elevator. A rollable cart is provided with specific clearances to accommodate the transition plate, and, when supporting a drum, allow for proper clearance between the top of the drum and the ram assembly.

18 Claims, 3 Drawing Sheets

SYSTEM FOR TRANSPORTING A CONTAINER CONTAINING VISCOUS LIQUIDS TO AN APPROPRIATE DISPENSING APPARATUS

This application claims the benefit of U. S. Provisional Application No. 60/159,556, filed Oct. 15, 1999.

FIELD OF THE INVENTION

This invention relates to an apparatus and system for transporting a container containing viscous liquids to an appropriate dispensing apparatus.

BACKGROUND OF THE INVENTION

Viscous liquids such as adhesives or sealants, are typically carried in cylindrical containers or drums. These drums often weigh between 400–600 pounds, and can hold up to 45 imperial gallons. Typically, these drums are positioned within a suitable dispensing apparatus, commonly known as a pump elevator. Pump elevators generally comprise a ram assembly that is forced down into the drum, and a pump that is attached to an opening in the ram assembly for evacuating the liquid from the drum. The drums are positioned or loaded within the pump elevator in such a manner that a ram plate of the ram assembly can accurately enter the drum. This positioning is often difficult given the weight of the drums.

Typically, a forklift truck carries a drum to the vicinity of the pump elevator. Operators of the pump elevator then lever the drum onto a drum cart. The cart rolls the drum adjacent the pump elevator, whereupon the drum is manually rotated and lowered in a controlled manner onto the edge of the pump elevator floor plate. The cart is removed and the drum is manually manoeuvred into place under the ram assembly. Once the drum is emptied it is manually pulled out of the pump elevator, removed, and the process is repeated with a new full drum.

Manual manipulation of heavy drums can cause numerous injuries to personnel. Further, if a drum is not properly placed within a pump elevator damage to the ram plate or associated seat of the ram assembly can occur. For example, if a drum is not properly aligned beneath the ram plate of the ram assembly, the ram plate can impact the top leading edge of the drum, causing damage.

It is known in some installations to provide a roller frame which extends into the pump elevator. The cart rolls the drum onto the roller frame which then retracts into the pump elevator. The cart is then removed and the drum is manually pushed into proper alignment under the ram assembly. This solution presents a tripping hazard on the floor adjacent the pump elevator, however, and is not often used for that reason.

It is also known to hoist a drum into the vicinity of a pump elevator. However, since a hoist and associated lifting apparatus cannot manoeuvre a drum under the ram assembly, and particularly the ram plate, an operator usually has to have the drum lowered to the floor, and then manually push the drum into proper alignment under the ram assembly.

It is also known for an operator to roll a cart holding a drum over the pump elevator floor plate and into position under the ram assembly. When the drum is empty the cart is withdrawn and the drum removed. There is, however, a sharp jolt to the cart and operator when the front castors of the cart hit the leading edge of the pump elevator floor plate. This impact can jolt the drum out of alignment with the ram assembly. This, in turn, can lead to damage to the seal of the ram assembly during operation of the pump elevator. Further, if the cart is moved at a high enough velocity to overcome the edge of the pump elevator floor plate, misalignment of the cart could occur causing a corner of the cart to hit one or two of the vertical air cylinders of the pump assembly, causing damage.

SUMMARY OF THE INVENTION

This invention allows for handling of containers or drums of viscous fluids so that they can be properly aligned with a ram assembly of a pump elevator, minimizing manipulation of the heavy containers by personnel, and thereby minimizing damage to the various components of the pump elevator, and particularly to the ram assembly and vertical air cylinders of the pump elevator, or to the drums themselves.

The invention comprises a transition plate that fits over a floor plate of a pump elevator, and particularly over an air tube that joins adjacent vertical air cylinders of the pump elevator. A rollable cart is then provided with specific clearances to accommodate the transition plate therebelow, and, when supporting a drum, allow for proper clearance between the top of the drum and the ram assembly.

In particular, this invention provides a system for transporting a container to a dispensing apparatus for emptying the container, wherein the dispensing apparatus has a floor plate, at least a pair of spaced apart vertical air cylinders, a ram assembly, and a pump. The system comprises a transition plate sized to fit between the air cylinders of the dispensing apparatus and over the floor plate of the dispensing apparatus. The transition plate has engagement means for engaging the dispensing apparatus to minimize to-and-fro movement of the transition plate over the floor plate, particularly as an object is rolled over the transition plate. The system also comprises a cart for supporting the container that is rolled over the transition plate to position the container in the dispensing apparatus with the container supported by the cart. In particular, the transition plate and the cart are dimensioned to position the container in the dispensing apparatus so that the top of the container is positioned beneath the ram assembly of the dispensing apparatus.

In particular the transition plate is configured to appropriately straddle the floor plate of the pump elevator and presents from at least one side thereof an inclined portion that provides a ramp enabling the cart to easily roll up and over the transition plate and be positioned over the floor plate of a pump assembly in alignment with the ram assembly.

BRIEF DESCRIPTION OF THE DRAWING FIGURES

For a better understanding of the present invention and to show more clearly how it would be carried into effect, reference will now be made, by way of example, to the accompanying drawings that show preferred embodiments of the present invention, and in which.

Figure 4:
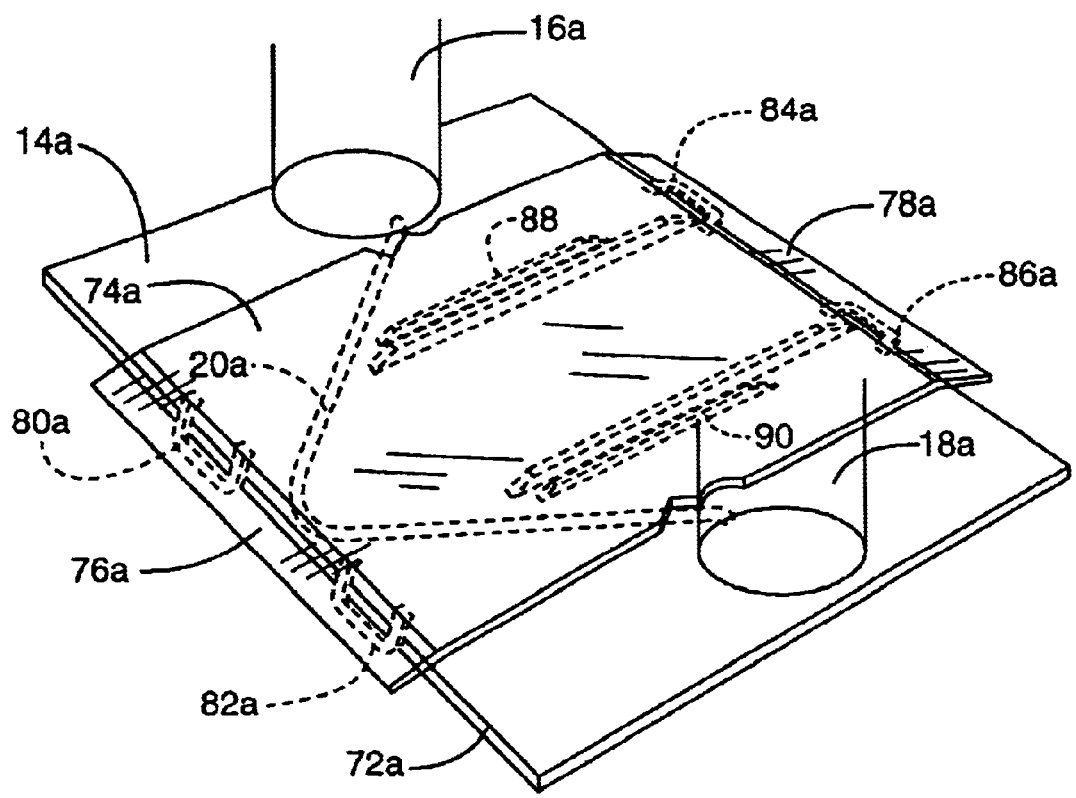

FIG. 4 a perspective view of an alterative embodiment of the transition plate of this invention.

DESCRIPTION OF THE PREFERRED EMBODIMENT

Viscous liquids, such as adhesives or sealants, are typically carried in cylindrical containers or drums 10. These drums often weigh between 400–600 pounds, and can hold up to 45 imperial gallons. A dispensing apparatus is utilized to empty the contents of drum 10. The most common dispensing apparatus used is a pump elevator 12, best illustrated in FIG. 1. These are made by a variety of manufacturers, such as Johnstone Pump Company or Graco Inc., but all feature a floor plate 14, vertical air cylinders 16, 18, an air tube 20 running across the floor plate 14 connecting vertical air cylinders 16, 18 at their base, and a ram assembly 22 featuring a ram plate 24, a seal 26, and a pump 28 attached to an opening 30 within the ram plate 24. Floor plate 14 can also include in some models supports 32, 34, and 36 that present upper edges 38, 40, and 42, respectively, above air tube 20.

In operation, a drum 10 is positioned on floor plate 14 of pump elevator 12. For the pump elevator illustrated in FIG. 1, the drum would be supported over air tube 20 by upper edges 38, 40, and 42, of supports 32, 34, and 36, respectively. Drum 10 is positioned between vertical air cylinders 16, 18, and with its top 44 placed under and in alignment with ram plate 24 of ram assembly 22. Ram plate 24 is then forced down into drum 10, and pump 28 evacuates the liquid from the container through opening 30. Seal 28 of ram assembly 22 prevents liquid from escaping between the edge of ram plate 24 and the inner wall of drum 10 as ram plate 24 is forced down into drum 10.

This invention is directed to a system for transporting a drum 10 to pump elevator 12 so that the drum is properly positioned between the vertical air cylinders 16, 18 and aligned under ram plate 24 of ram assembly 22. In particular, a cart 46 is provided comprising a base 48 for supporting drum 10, a forward housing 50 to retain castors 52, 54, a rearward housing 56 to retain castors 58, 60, and a handle 62, attached to rearward housing 56 to allow a person to push cart 46 so that it rolls over a surface on its respective castors. A side wall 84 extends upwardly from base 48 along one side and between forward housing 50 and rearward housing 56 to form an enclosure 66 to hold drum 10. The side between forward housing 50 and rearward housing 56 opposite side wall 64 is open as at 68 allowing easy loading and off loading of drum 10. The enclosure is typically 25" in length (from forward housing 50 to rearward housing 56) and generally 24–25" in width. This allows cart 46 to support a typical drum 10, yet fit between vertical air cylinders 16, 18. It can be appreciated, however, that different carts can have different dimensions to accommodate different sized drums and pump elevators.

Cart 46 is designed to receive within enclosure 66 a full drum 10 from, for example, a forklift (not illustrated). The drum is inserted through open side 68 so that it is supported upon base 48. Moreover, base 48 carries drum 10 so that top 44 of drum 10 has adequate clearance to fit beneath ram plate 24 of ram assembly 22 when ram plate 24 is at its uppermost extent.

Cart 46 also features a foot brake 70 to engage, for example, a surface, such as a floor, to prevent the cart from rolling. Other braking mechanisms are contemplated, however, such as, for example, frictional engagement of one or more of castors 52 or 54, or 58 or 60.

Cart 46 is designed to bring drum 10 over floor plate 14 of pump elevator 12 so that drum 10 is positioned between vertical air cylinders 16, 18 and in alignment with ram plate 24 of ram assembly 22. Floor plate 14 includes a number of obstacles that cart 46 must roll over to achieve the desired positioning of drum 10. For the pump elevator illustrated in FIG. 1, the obstacles can include air tube 20, supports 32, 34, and 36, and an edge 72 that can extend around floor plate 14 between such plate and the surface that pump elevator 12 rests upon. To allow cart 46 to roll over floor plate 14 of pump elevator 12 with minimal impact to both the cart (and the carried drum) and the pump elevator, a plate 74 is provided to cover floor plate 14 and provide a smooth transition for cart 46 as it rolls from the surface upon which pump elevator 12 rests and over floor plate 14.

Figure 1:
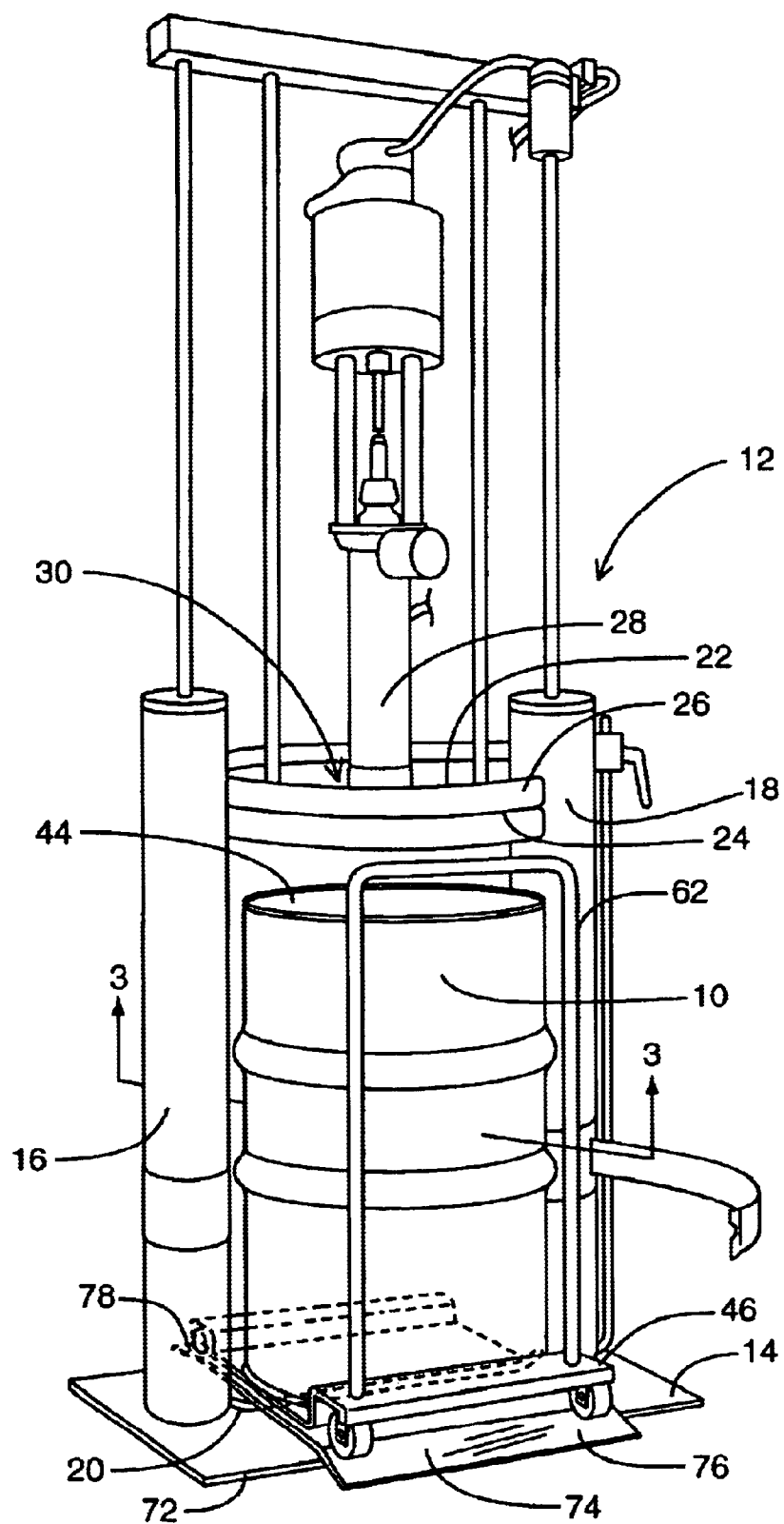
FIG. 1 is a perspective view of a pump elevator with a container or drum aligned with a ram assembly of the pump elevator using the system of this invention.
Figure 2:
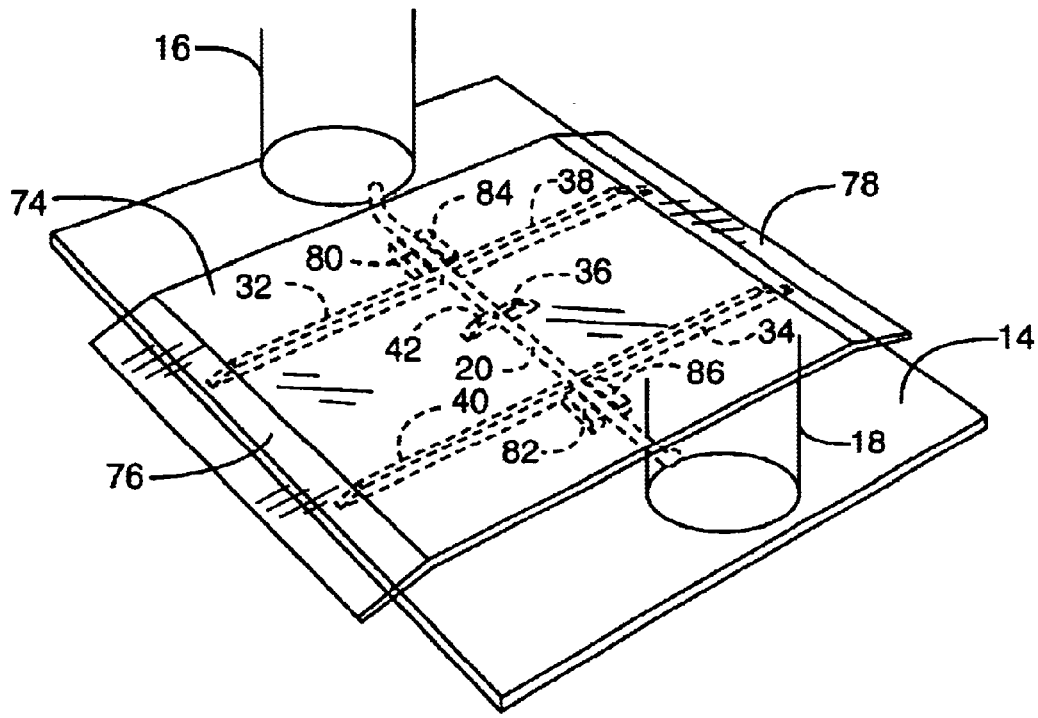
FIG. 2 is a perspective view of a transition plate of this invention overlying a floor plate of the pump elevator of FIG. 1.

Transition plate 74 fits between vertical air cylinders 16, 18 of pump elevator 12 and over floor plate 14 including over air tube 20 and any other potential obstacles, such as supports 32, 34, and 36. Transition plate 74 features an inclined portion 76 that extends from one side thereof downwardly to the surface upon which pump elevator rests. In a preferred embodiment the opposing side of transition plate 74 features a similarly inclined portion 78. As seen in FIG. 1, when transition plate 74 extends over floor plate 14 of pump elevator its inclined portions 76 and 78 extend over edge 72 of floor plate 14 to the surface upon which pump elevator 12 rests: transition plate 74 straddles floor pate 14. Transition plate 74 is dimensioned so that its width fits between vertical air cylinders 16, 18 of pump elevator 12 (typically 29–30") and its length is sufficient to span the front to rear extent of floor plate 14 of pump elevator 12 (typically 28–32"). Different transition plates can have different dimensions, however, to accommodate different constructions of pump elevators, and particularly the associated floor plate. Moreover, transition plate 74 need not be rectangular in construction (as illustrated in FIG. 1). Further, inclined portions 76 and 78 should raise transition plate 74 above the surface upon which pump elevator 12 rests a sufficient height to clear floor plate 14 including air tube 20 and supports 32, 34, and 36. Optionally, transition plate 74 could receive some support from contacting upper edges 38, 40, and 42 of supports 32, 34, and 36, respectively—particularly when cart 46 is rolled over transition plate 74. It should be noted, however, that transition 74 plate should not be so high as to prevent cart 46 from rolling over floor plate 14 when placing a drum 10 in pump assembly 12, ie. top 44 of drum 10 must have adequate clearance to fit beneath ram plate 24 of ram assembly 22 when ram plate 24 is at its uppermost extent.

When cart 46 contacts transition plate 14 at the boundary between the surface supporting pump elevator 12 and one of the inclined portions 76 or 78, a forward or rearward motion can be imparted to transition plate 74. In the embodiment illustrated in FIG. 1 and best seen in FIG. 3, transition plate 74 includes on its underside thereof depending lugs 80, 82, and 84, 86 that are spaced on either side of air tube 20 over its extent between vertical air cylinders 16, 18. Depending lugs 80, 82, and 84, 86 assist in placing transition plate 74 over floor plate 14 between vertical air cylinders 16, 18, and in minimizing or preventing to-and-fro motion of transition plate 74 over plate 14, particularly under impact of cart 46 on inclined portions 76 or 78.

Figure 3:
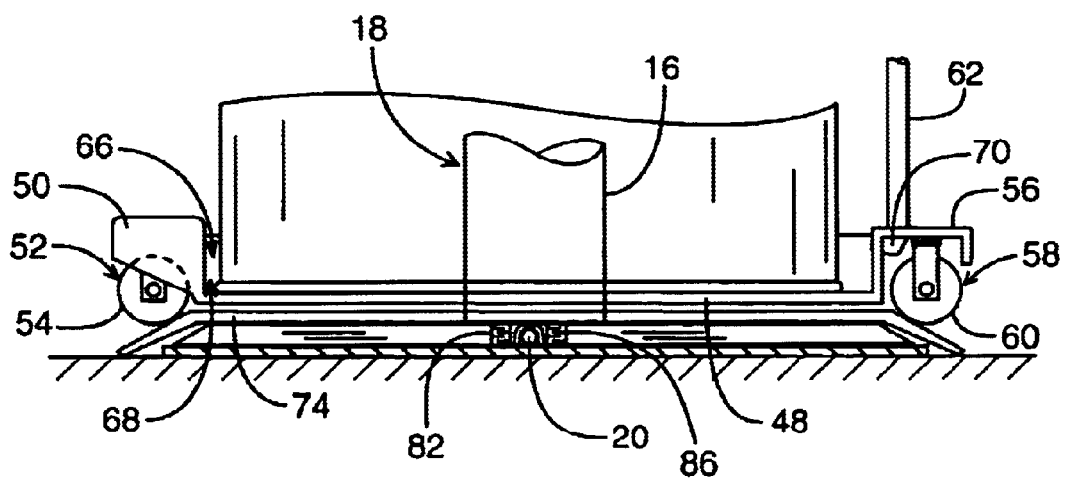
FIG. 3 is a side sectional view taken along the lines 3—3 of FIG. 1.

In operation cart 46 supporting a full drum 10 is rolled over the surface supporting pump elevator 12, up inclined portion 76 and over transition plate 74 until drum 10 is appropriately positioned between vertical air cylinders 16, 18 and aligned under ram plate 24 of ram assembly 22. Brake 70 can then be applied to secure cart 46 in place, particularly against to-and-fro motion. If the distance between front castors 52, 54 and rear castors 58, 60 is sufficient, then cart 46 will straddle transition plate 74, as best illustrated in FIG. 3. Moreover, appropriate dimensioning of the wheel base between front castors 52, 54 and rear castors 58, 60 with inclined portions 76 and 78, respectively, of transition plate 74, can further aid in preventing to-and-fro motion of cart 46 over floor plate 14 (see FIG. 3).

An alternative embodiment of transition plate 74a is provided in FIG. 4. Certain pump elevators feature air tube 20a running across floor plate 14a between vertical air cylinders 16a, 18a toward the rear of the floor plate 14a. In this instance transition plate 74a features lugs 80a, 82a, and 84a, 86a depending from inclined portions 76a, 78a, respectively. Lugs 80a, 82a, engage edge 72a at the front of floor plate 14a while lugs 84a, 86a engage edge 72a towards the rear of floor plate 14a—preventing to-and-fro motion of transition plate 74a over floor plate 14a.

Where the floor plate of the pump elevator does not feature any support plates (such as 32, 34, and 36 for floor plate 14 in FIG. 1), then it is possible to design the transition plate with appropriate supports. For example, in FIG. 4, transition plate 74a features additional supports 88, 90 which can rest upon floor plate 14a.

It can be appreciated that variations to this invention would be readily apparent to those skilled in the art, and this invention is intended to include those alternatives.

The Embodiment of the Invention in Which an Exclusive Property or Privilege is claimed are Defined as Follows:

1. A system for transporting a container to a dispensing apparatus for emptying the container, the dispensing apparatus having a floor plate, at least a pair of spaced apart vertical air cylinders, a ram assembly, and a pump, the system comprising:
   a. a cart for supporting the container, the cart rollable over a surface; and
   b. a transition plate sized to fit between the air cylinders of the dispensing apparatus and over the floor plate of the dispensing apparatus, the transition plate having a width that extends between the air cylinders a sufficient extent to allow the cart to be rolled over the transition plate and between the air cylinders, and having a length sufficient to extend over the floor plate, and the transition plate having engagement means for engaging the dispensing apparatus to minimize to-and-fro movement of the transition plate over the floor plate,
and wherein the transition plate and the cart are dimensioned so that when the cart is rolled over the transition plate to position the container in the dispensing apparatus with the container supported by the cart, the top of the container is positioned beneath the ram assembly of the dispensing apparatus.

2. A system according to claim 1 wherein the transition plate comprises at least one inclined surface positioned to allow the cart to be rollable over the transition plate.

3. A system according to claim 1 wherein the transition plate comprises two inclined surfaces positioned to allow the cart to be rollable over the transition plate.

4. A system according to claim 3 wherein the transition plate presents a substantially flat surface between the inclined surfaces.

5. A system according to claim 1 wherein the engagement means comprise depending lugs.

6. A system according to claim 5 wherein the depending lugs are adapted to engage opposed edges of the floor plate.

7. A system according to claim 1 wherein the transition plate is positioned over an air tube that extends across the floor plate between the air cylinders of the dispensing apparatus.

8. A system according to claim 7 wherein the engagement means comprise depending lugs spaced on either side of the air tube.

9. A system according to claim 1 further comprising supports provided between the transition plate and the floor plate.

10. A system according to claim 9 wherein the supports are provided by the floor plate.

11. A system according to claim 9 wherein the supports are provided by the transition plate.

12. A system according to claim 1 wherein the cart comprises an enclosure for receiving the container.

13. A system according to claim 12 wherein the enclosure comprises a base for supporting the container and surrounding walls, and wherein the surrounding walls are open over a portion thereof.

14. A system according to claim 13 wherein the base of the cart is generally rectangular in configuration, and wherein the surrounding walls are open along one side thereof.

15. A system according to claim 14 wherein the cart further comprises forward and rearward housings that present two of the side walls.

16. A system according to claim 15 wherein the forward and rearward housings retain castors.

17. A system according to claim 16 wherein the forward and rearward castors are spaced sufficiently apart to allow the cart to straddle the transition plate.

18. A system according to claim 16 wherein the cart further comprises a handle.

* * * * *